US008010038B2

(12) United States Patent
Valentine et al.

(10) Patent No.: US 8,010,038 B2
(45) Date of Patent: Aug. 30, 2011

(54) SYSTEM AND METHOD FOR COVERTLY DISABLING IMPROVISED EXPLOSIVE DEVICES

(75) Inventors: Eric Lee Valentine, Plano, TX (US); Walter Lee Davidson, McKinney, TX (US); Michael Coyne, Dallas, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 539 days.

(21) Appl. No.: 12/212,363

(22) Filed: Sep. 17, 2008

(65) Prior Publication Data

US 2010/0068988 A1 Mar. 18, 2010

(51) Int. Cl.
*H04Q 7/20* (2006.01)

(52) U.S. Cl. ...... 455/1; 455/422.1; 455/403; 455/426.1; 455/550.1; 455/418; 89/1.13; 102/401; 102/418; 102/427

(58) Field of Classification Search ........... 455/1, 422.1, 455/403, 500.1, 517, 418–420, 426.1, 426.2, 455/445; 89/1.13; 102/401, 418, 427
See application file for complete search history.

(56) References Cited

U.S. PATENT DOCUMENTS

| | | | | |
|---|---|---|---|---|
| 7,552,670 | B2 * | 6/2009 | Goldman et al. | 89/1.13 |
| 7,746,265 | B2 * | 6/2010 | Brumley et al. | 342/13 |
| 7,870,813 | B2 * | 1/2011 | Ham et al. | 89/1.11 |

* cited by examiner

*Primary Examiner* — Keith Ferguson

(57) ABSTRACT

A method and system of disabling a remote improvised explosive device (IED) that is triggered by a cell phone. A portable wideband network system, installed in a vehicle, is used to determine operator frequency or frequencies active on a route along which the vehicle will travel. The vehicle includes a wideband transmitter for raising a radio frequency noise floor across all of the active cellular frequencies in a limited area surrounding the portable wideband network system during passage along the route. A notch filter is used by the system for filtering a particular frequency from the noise floor. The power level of the portable wideband network system is increased so that the strongest signal at the particular frequency in the limited area is provided by the portable system's base station. All mobile terminals in the limited area around the vehicle are connected to the portable system and the portable system prevents call completion of any of the connected mobile terminals.

21 Claims, 2 Drawing Sheets

SYSTEM AND METHOD FOR COVERTLY DISABLING IMPROVISED EXPLOSIVE DEVICES

BACKGROUND

IEDs, or "improvised explosive devices", are popular tools for terrorists. An IED typically consists of an explosive charge, a detonator (i.e., blasting cap), and an initiator used for causing the detonator to explode. One of the most common devices used as an initiator is a mobile terminal (hereinafter, also referred to as cell phone, or mobile phone). The IED can be triggered (initiated) from a remote location by calling, sending a message, or otherwise activating the ringer/speaker electronics of the mobile terminal connected to the IED. The cell phone is the initiator and instead of a call causing the phone ringer to ring, the power for the ringer is typically sent to the detonator which detonates the explosive charge.

Since the cell phone is used in a criminal act, most terrorists use a prepaid Subscriber Identity Module (SIM) card in the initiator rather than a SIM card registered in the terrorists name. Obviously, a prepaid card, having no registration name is much harder to trace.

Currently jamming devices that are used to protect convoys traveling through known trouble areas also prevent any mobile terminals in a given area from accessing the network. One drawback to jamming is that legitimate users are denied access to the wireless system. In addition, these jamming devices essentially telegraph convoy movements by making all mobile terminals within the area of movement inoperable. Another problem is that tracking and locating devices work only when the mobile terminal is transmitting, so most of the time a "quiet" terminal (e.g., initiator cell phone in an IED) cannot be located.

What is needed is a method for suppressing the triggering of IEDs without revealing that convoy movement is imminent in a particular area and to do so in such as way that the potential to trace the call is enhanced. This solution must assume limited to no cooperation with mobile operators.

SUMMARY

The present invention provides a message from the control node to the second node identifying the specified MG. This disclosure discusses the suppression of IED triggers via GSM mobile phones by making modifications to GSM network equipment. In one embodiment, it also enhances capabilities to trace the origin of the calls that cause detonation.

In one embodiment, a portable wideband network system (also referred to as a portable network), installed in a vehicle, is used to determine operator frequency or frequencies active on a route along which the vehicle will travel. The vehicle includes a wideband transmitter for raising a radio frequency noise floor across all of the active cellular frequencies in a limited area surrounding the portable wideband network system during passage along the route. A notch filter is used by the system for filtering a particular frequency from the noise floor. The power level of the portable wideband network system is increased so that the strongest signal at the particular frequency in the limited area is provided by the portable system's base station. All mobile terminals in the limited area around the vehicle are connected to the portable system and the portable system prevents call completion of any of the connected mobile terminals. With a directional, or multi-sector, antenna, one or more of the systems can also provide information as well as prevent a call from triggering a cell phone initiator. Local operator MSCs or HLRs may then be accessed to determine the identity of suspicious cell phones that connect to the mobile network.

In another embodiment a wideband radio frequency generator is included with a portable wideband network system. The frequency generator is set automatically or manually to local frequencies in an area in which the portable wideband system will travel. In, for instance, Iraq, a vehicle with the system installed may travel through city streets and the local operator frequencies that are detected are determined and the wideband radio frequency generator raises a "noise" floor across all of the active frequencies in a limited area surrounding the portable network system during passage along the route traveled by the vehicle. A notch filter is also provided for filtering a particular frequency from the noise floor. The power level of the portable network system is increased at the particular frequency, basically the width of the channel that the local base station transmit on (e.g., for GSM, 200 khz per GSM transceiver). The portable network system transmits the strongest signal on the particular frequency in the limited area around the portable wideband network. This permits connecting all mobile terminals in the limited area to the portable network system and preventing call completion of any connected mobile terminals.

BRIEF DESCRIPTION OF THE DRAWINGS

In the following section, the invention will be described with reference to exemplary embodiments illustrated in the figures, in which.

DETAILED DESCRIPTION

Figure 1:
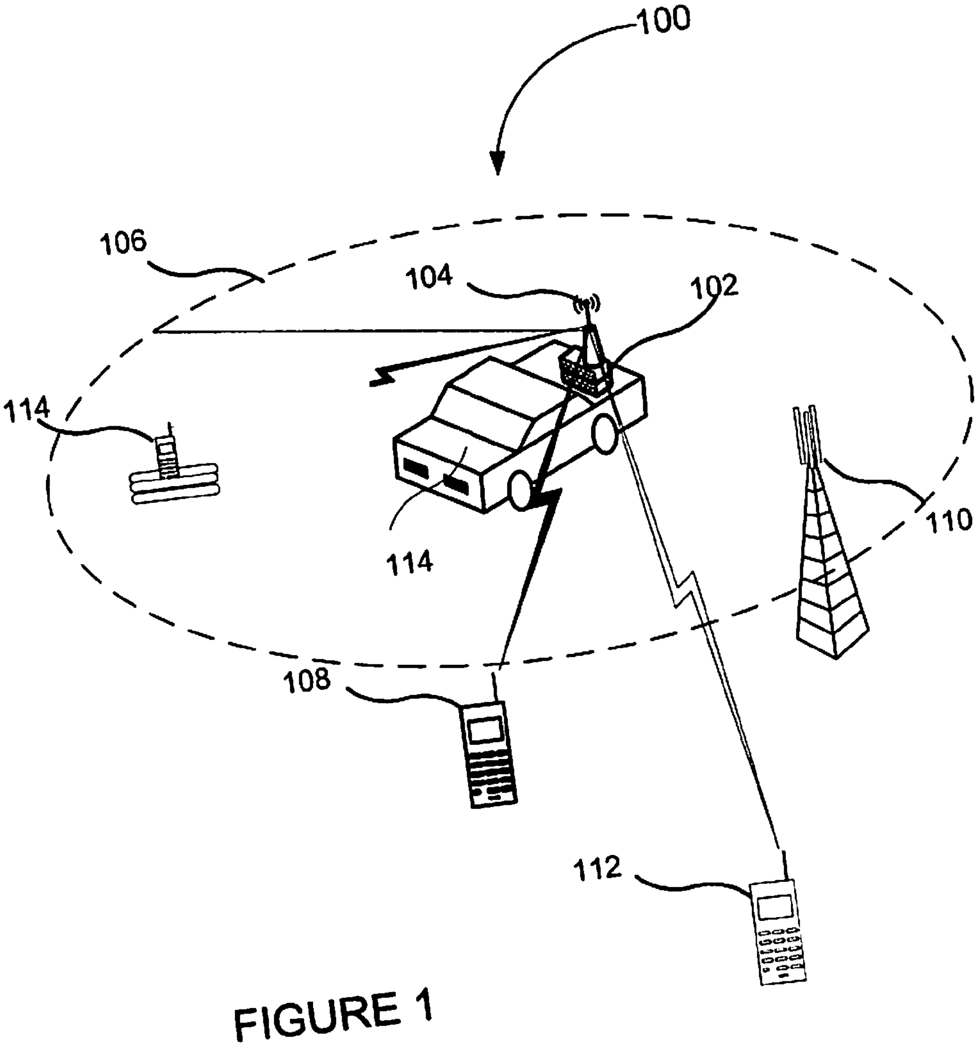
FIG. 1, depicts a system for disabling Improvised Explosive Devices according to a preferred embodiment of the present invention.

FIG. 1 depicts a high level block diagram of a system 100 for disabling Improved Explosive Devices according to a preferred embodiment of the present invention. A mobile network system 102 and a wideband RF transmitter 104 is installed in vehicle 114 for transport through an area that may have IEDs. Wideband RF transmitter 304 is used to raise the level of noise floor 106 within a predetermined area surrounding mobile network system 102. Noise floor 106 may be effective across a wide spectrum (for instance from 450 Mhz to 2100 Mhz) with a "notch" around a particular frequency, for instance 900 Mhz. A portable GSM, GPRS or WCDMA system would operate on this 900 Mhz frequency at a power level above noise floor 106. This notch (not shown) causes mobile or wireless terminals operating on the 900 Mhz frequency, for instance, within range (typically inside the noise floor range) of mobile network platform 102 to camp on to mobile network system 102. Once the terminals in the area surrounding vehicle 114 have camped on mobile network platform 102, incoming calls for the purpose of detonating the IED will become ineffective because calls from the calling terminal portion of the IED will be terminated at the portable wideband system.

In the present invention, mobile network system 102, e.g., QuicLink from Ericsson, provides the same functions as a regular network operator, only for a reduced and, in this case, moving area. Essentially, mobile network system 102 includes a Base Station controller (BSC), Base Transceiver Station (BTS), an MSC, Home Location Register (HLR), Visitor Location Register (VLR), a BSC (for the antenna installation associated with the moving network) and wideband transmitter 104 for transmitting "noise" in the frequency bands covered by commercial cellular systems that are operating in the area where mobile network platform 102 is traveling. The area covered by the moving network is limited due to the single, moving platform on which the network is located and the obvious limited power available to the system. Mobile network system 102 can be configured to broadcast the network ID of a network that is normally active in that area. Therefore, users will not notice a difference in the network being displayed on their mobile phones.

The BTS (not shown) of mobile network system 102 and base station 110 transmit a "pilot" signal or "control channel signal" which is received by cell phones within range of Base Station 110 and the BTS. The cell phones, both legitimate 112 and IED initiator cell phone 108 measure all the pilot signals they receive and transmit these measurements to the BTS on the mobile network platform 102 and to BS 110. BS 110 receives signals from both cell phone 112 and cell phone 108. These measurements are the level of signal and signal quality of BS 110 and BTS signals received by cell phone 108.

These measurements are typically used by a network to determine a frequency and channel for a cell phone to connect through a Base Station to a cellular network. And, as a cell phone approaches a connecting tower, the cell phone is commanded to reduce signal power and as the cell phone moves away, the signal is commanded to increase. This exchange of information is what keeps a phone connected to a network. The phone must hear the tower and the tower must hear the phone and as long as this condition is in place, the cell phone stays connected to the network. Also, a power level at which the cell phone is to transmit is provided by mobile network platform 102. In this case, mobile network system 102 has raised the noise floor level so that BS 110 is drowned out and cell phones 112 and 108 will attempt to connect to mobile network system 102 because of the "notch" frequency transmitting at the higher power. In the present situation, cell phones 112, 108 and 114 are all connected to mobile network system 102.

Depending on the frequencies used in the area traversed by the mobile network platform, a "notch" can be used in a particular frequency band (for instance if 900 Mhz is not used in an area otherwise providing GSM services). If all relevant frequencies are in use, then the noise floor across the entire spectrum can be raised, in effect "drowning out" the local networks so that mobile terminals cannot hear or connect to them.

Since the noise floor is drowning out all the neighboring base stations, mobiles in the area will re-home onto this portable (often moving) network (the instant explanation assumes a transportable network such as Ericsson's Quiclink or a similar system using Altobridge).

With no additional functionality, this means that a call to the mobile phone connected to the explosive device will be routed to the GMSC where the mobile phone was "registered". The signal is then routed to the portable network's MSC, where the IED mobile phone (initiator) is now registered but unconnected. The person attempting to detonate the bomb will receive "subscriber unavailable" treatment and the call will not be completed to the initiator cell phone. During the period while mobiles are locked onto the moving network, users that originate calls can receive customary call treatments such as re-order tones, etc.

Figure 2:
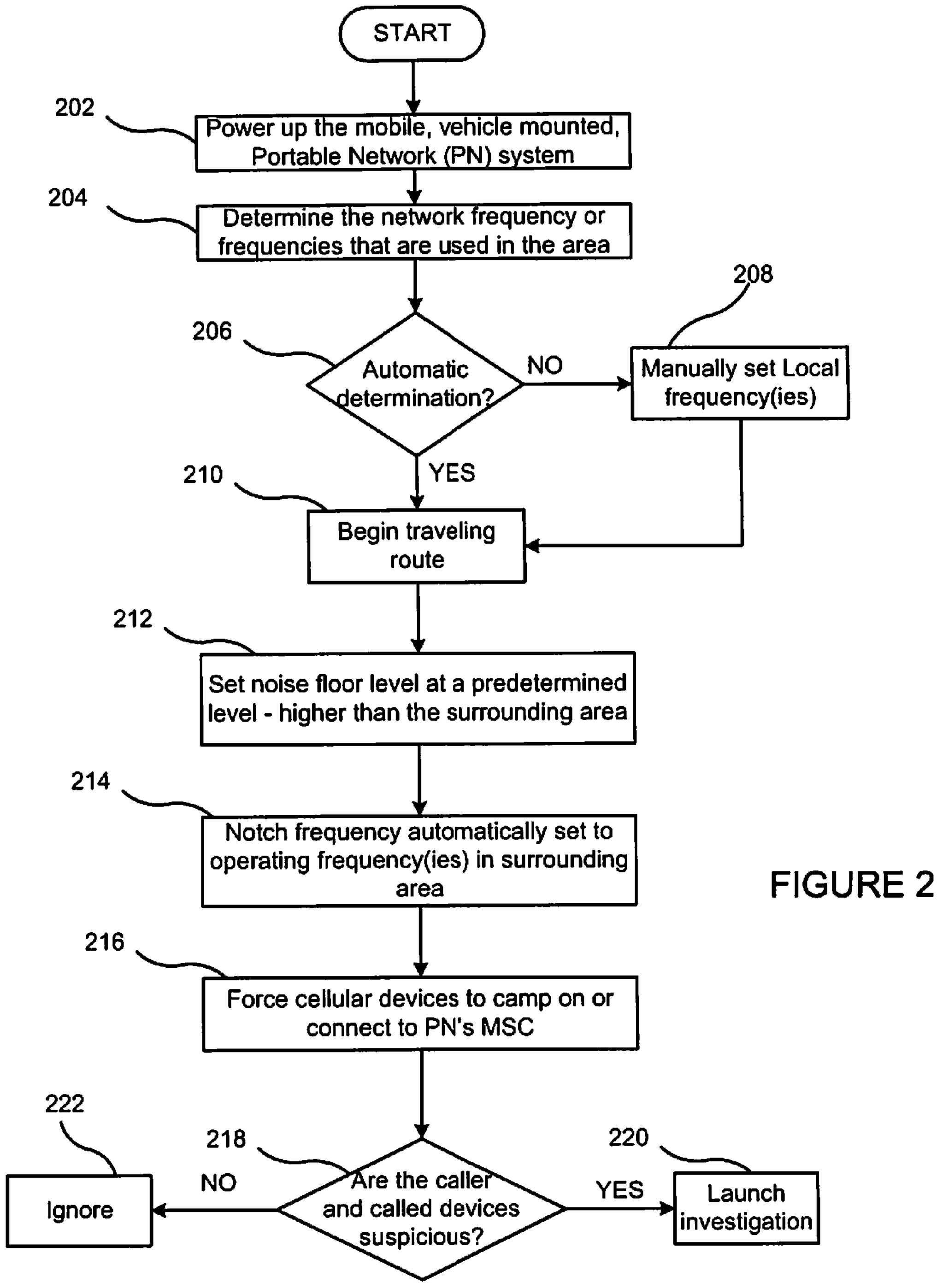
FIG. 2, illustrates a process for covertly disabling cell phone triggered Improvised Explosive Devices in accordance with a preferred embodiment of the present invention.

FIG. 2 illustrates a process for covertly disabling cell phone triggered Improvised Explosive Devices (IEDs) in accordance with a preferred embodiment of the present invention. The process is implemented in a portable network, a so-called "network in a box". All the equipment to implement a network for a reduced number of subscribers including MSC, BS, BSC, MSC authentication, etc., is included in a unit that can be loaded in a "Humvee" military vehicle for instance. A mobile network system or, portable network (PN), and a wideband radio frequency noise generator is installed in a military vehicle prior to being used when traveling from one point to another in an area that may include IEDs.

The process begins with step 202 as the PN is loaded, either before or during the beginning of the PN trip, with determining the frequencies used by local cellular operators (step 204). The process proceeds to step 206 where the operators' frequencies are set in the PN. If the PN is not equipped with a frequency sniffer, the process moves to step 208 where the local frequencies are manually entered into the PN. If the PN is equipped with a frequency sniffer, the process next goes to step 210 and the PN begins automatically determining the active frequencies in the area affected by the antenna footprint of the PN (see FIG. 1) and the vehicle carrying the PN begins the trip (step 210)

The process continues to step 212, when the PN is operating a wideband radio frequency transmitter causes a "noise floor" to be transmitted in a radius around the vehicle. This noise floor is for "drowning" out the local base stations using the known or sniffed frequencies (of course the area of coverage of the PN is dependent on the PN transmitter power and antenna configuration). In one embodiment, a manual adjustment of the frequencies may be made in response to measured (e.g., a simple radio survey) or known cellular frequencies in an area. A more advanced approach is to use a frequency sniffer to "sniff" frequencies in the surrounding area being used by the local operators. Noise is then transmitted selectively on the sniffed and determined frequencies to raise the noise floor level. The latter approach has the advantage of not causing undue interference in frequency bands that are not used for cellular services, while the manual approach is technically less challenging. Effectively, the noise is drowning out regular cellular system transmissions and the portable network is providing a signal level higher than the local, stationary base stations near an IED. With the noise level higher than normal any nearby active cell phones (e.g., an active IED with a cell phone as trigger) either camp on the Portable Network pilot channel or connect to the Portable Network.

Once the local frequency bands are blanketed by noise, a notch frequency is introduced around a specific frequency, preferably the frequency of operators in the area (step 214). The portable wideband radio frequency generator raises the noise floor across a wide spectrum (for instance from 450 Mhz to 2100 Mhz) with a "notch" around a particular frequency, for instance 900 Mhz. A portable GSM system operates on this 900 Mhz frequency at a power level above the noise floor. This causes terminals to camp on to the portable network (step 216). Once that has been achieved, then incoming calls for the purpose of detonating the IED will become ineffective. As will be detailed, this approach can be covert as well as lend itself to tracing the origin of the calls intended to detonate the devices.

As a further enhancement, once mobiles are locked onto the moving and temporary mobile network platform, this network can register the users that tried to make connections during the travel of the mobile network platform. By doing so, incoming calls to the area covered by the protective cellular "bubble" will then actually terminate in an MSC of our choosing. This provides the possibility to run traces on calls that are incoming to the area where the vehicle or convoy is located.

The registered users can then be checked against the HLR of a local subscription network by, for instance, using or spoofing point codes from actual cooperating networks (step 218). If the subject users are not considered suspicious, the process moves to step 222 and the investigation into the user is dropped. If the caller and called devices are deemed suspicious, the process moves instead to step 220.

Forcing terminals to register onto this moving network also provides various other possibilities; e.g., hooking up with one or more other mobile network platforms traveling in tandem in an area to triangulate the location of mobile cell calls (for instance a call to a mobile phone in the middle of a street, may or may not be suspicious) and an application on the mobile network platform MSC or the MSC within which they are registered (or IMS) could be used originate calls. This creates the possibility to originate controlled calls to all terminals that are registered in the mobile platform MSC, so that detonations can be triggered when it is more convenient or safe. Such an application in a helicopter would allow “sweeps” of areas, potentially triggering the devices while they are being manufactured or transported.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

The invention claimed is:

1. A method of disabling a remote improvised explosive device (IED), the IED utilizing a cell phone as a trigger device, the method comprising the steps of:

determining an operator frequency or frequencies active on a route along which a portable wideband network system will travel;

raising a radio frequency noise floor, across all of the active cellular frequencies in a limited area surrounding the portable wideband network system during passage along the route;

filtering a particular frequency from the noise floor using a notch filter;

increasing the power level of the portable wideband network at the particular frequency so that the portable wideband network system transmits the strongest signal on the particular frequency in the limited area around the portable wideband network;

connecting all mobile terminals in the limited area to the portable wideband network system; and preventing call completion of any connected mobile terminals.

2. The method of claim 1, wherein the portable wideband network system comprises:

a Mobile switching Services Center (MSC);

a Base Station Controller (BSC);

a Base Transceiver Station (BTS); and a Visitor Location Register (VLR).

3. The method of claim 2, wherein the portable wideband network system further comprises a wideband radio frequency generator for raising the radio frequency noise floor.

4. The method of claim 1, further comprising allowing mobile terminals in the limited area to camp on the portable wideband system without completing the call.

5. The method of claim 1, wherein the limited area is determined by antenna configuration and the portable wideband network system.

6. The method of claim 1, further comprising moving the portable wideband network system in a sweep of a targeted area, suspected of having an IED.

7. The method of claim 1, wherein the step of filtering a particular frequency is accomplished either manually, automatically or both.

8. The method of claim 1, wherein the portable wideband transmitter comprises a multi-sector antenna, the multi-sector antenna providing directional information regarding any connected mobile phone.

9. The method of claim 1, further comprising determining an identity of the any connected mobile terminals and determining call history of the any connected mobile terminals.

10. The method of claim 1, further comprising determining the location of a targeted mobile terminal.

11. An apparatus for disabling a remote improvised explosive device (IED), the IED utilizing a cell phone as a trigger device, the apparatus comprising:

a portable network system;

a vehicle for carrying the portable network system;

means for determining an operator frequency or frequencies active on a route along which the portable network system will travel;

transmitter means for raising a radio frequency noise floor across all of the active cellular frequencies in a limited area surrounding the portable network system during passage along the route;

a notch filter for filtering a particular frequency from the noise floor;

means for maintaining the power level of the portable network system at the particular frequency so that the portable network system transmits the strongest signal on the particular frequency in the limited area around the portable wideband network;

connecting all mobile terminals in the limited area to the portable network system; and preventing call completion of any connected mobile terminals.

12. The apparatus of claim 11, wherein the portable network system is a portable wideband network system, the apparatus further comprising:

a wideband radio frequency noise generator;

a Mobile switching Services Center (MSC);

a Base Station Controller (BSC);

a Base Transceiver Station (BTS); and a Visitor Location Register (VLR).

13. The apparatus of claim 12, further comprising means for determining an identity of a targeted, connected mobile terminal and means for determining calling history of the targeted connected mobile terminal.

14. The apparatus of claim 12, further comprising means for determining the location of a targeted mobile phone.

15. The apparatus of claim 12, further comprising:

means for determining a called number from the targeted, connected mobile terminal and means for tracing the called number to determine if a phone associated with the called number is stolen, is a prepaid phone, whether the called number has received any previous calls, and how long the called number has been activated, wherein according to the results of the tracing, if the called number has been called infrequently or not at all, the called number has made no calls, the time since activation does not correlate with probable usage, means for immediately notifying a predetermined authority for tracking and investigating the calling number and called number owner.

16. The apparatus of claim 12, wherein the portable wideband network system further comprises a wideband transmitter for raising the radio frequency noise floor.

17. The apparatus of claim 12, further comprising means for allowing mobile terminals in the limited area to camp on the portable wideband system without completing the call.

18. The apparatus of claim 12, wherein the limited area is determined by antenna configuration and the portable wideband network system.

19. The apparatus of claim 12, further comprising means for moving the portable wideband network system in a sweep of a targeted area, suspected of having an IED.

20. The apparatus of claim 12, further comprising means for filtering a particular frequency either manually, automatically or both.

21. The apparatus of claim 12, wherein the portable wideband network system further comprises a multi-sector antenna, the multi-sector antenna providing directional information regarding any connected mobile phone.

* * * * *

UNITED STATES PATENT AND TRADEMARK OFFICE

CERTIFICATE OF CORRECTION

PATENT NO. : 8,010,038 B2
APPLICATION NO. : 12/212363
DATED : August 30, 2011
INVENTOR(S) : Valentine et al.

It is certified that error appears in the above-identified patent and that said Letters Patent is hereby corrected as shown below:

In Column 2, Line 36, delete "invention;" and insert -- invention. --, therefor.

Signed and Sealed this
Tenth Day of January, 2012

David J. Kappos
*Director of the United States Patent and Trademark Office*